US012804083B2

(12) United States Patent
Funaki

(10) Patent No.: US 12,804,083 B2
(45) Date of Patent: Nov. 17, 2026

(54) INFORMATION PROCESSING SYSTEM, NON-TRANSITORY COMPUTER READABLE MEDIUM, AND INFORMATION PROCESSING METHOD

(71) Applicant: FUJIFILM BUSINESS INNOVATION CORP., Tokyo (JP)

(72) Inventor: Shota Funaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/363,609

(22) Filed: Aug. 1, 2023

(65) Prior Publication Data

US 2024/0314247 A1 Sep. 19, 2024

(30) Foreign Application Priority Data

Mar. 17, 2023 (JP) ................................ 2023-043089

(51) Int. Cl.
*H04N 1/00* (2006.01)

(52) U.S. Cl.
CPC ..... *H04N 1/00087* (2013.01); *H04N 1/00074* (2013.01)

(58) Field of Classification Search
CPC ....................... H04N 1/00087; H04N 1/00074
See application file for complete search history.

(56) References Cited

U.S. PATENT DOCUMENTS

2009/0251713 A1* 10/2009 Funane .............. H04N 1/00973 358/1.9
2016/0036631 A1* 2/2016 Shibata ................... G06F 11/00 709/221

FOREIGN PATENT DOCUMENTS

JP 2017-038356 A 2/2017

* cited by examiner

*Primary Examiner* — Moustapha Diaby
(74) *Attorney, Agent, or Firm* — Oliff PLC

(57) ABSTRACT

An information processing system includes a processor configured to perform a process, the process including: holding, in a predetermined region, specific setting information that is setting information to be reflected onto a machine to be installed and that has been specified in an environment different from a machine to be actually set up; and, in reflecting the specific setting information onto the machine, in a case where it is determined that a conflict occurs between the specific setting information held in the predetermined region and setting information preconfigured on the machine, notifying a predetermined notification destination, receiving a command to resolve the conflict, and reflecting the conflict-resolved setting information onto the machine.

9 Claims, 19 Drawing Sheets

FIG. 10

| DEVICE ID | SETTING ITEM | VALUE | REQUESTER | CONFLICT KEY |
|---|---|---|---|---|
| 000001 | SETTING A | 1 | REAL DEVICE | 1 |
| 000001 | SETTING A | 2 | VIRTUAL DEVICE | 1 |
| 000001 | SETTING B | true | MPS | 1 |
| ... | ... | ... | ... | ... |

FIG. 11

| DEVICE ID | SETTING ITEM | VALUE | REQUESTER |
|---|---|---|---|
| 000001 | SETTING A | 2 | VIRTUAL DEVICE |
| 000001 | SETTING B | true | MPS |
| 000002 | SETTING B | true | MPS |
| ... | ... | ... | ... |

FIG. 12

| DEVICE ID | SETTING ITEM | VALUE |
|---|---|---|
| 000001 | SETTING A | 1 |
| 000001 | SETTING B | false |
| 000001 | SETTING C | 5 |
| ... | ... | ... |
| 000002 | SETTING A | 1 |
| ... | ... | ... |

INFORMATION PROCESSING SYSTEM, NON-TRANSITORY COMPUTER READABLE MEDIUM, AND INFORMATION PROCESSING METHOD

CROSS-REFERENCE TO RELATED APPLICATIONS

This application is based on and claims priority under 35 USC 119 from Japanese Patent Application No. 2023-043089 filed Mar. 17, 2023.

BACKGROUND

(i) Technical Field

The present disclosure relates to an information processing system, a non-transitory computer readable medium, and an information processing method.

(ii) Related Art

Japanese Unexamined Patent Application Publication No. 2017-038356 proposes an information processing apparatus including: a management unit configured to manage setting information about settings of an image forming apparatus; a receiving unit configured to receive, from the image forming apparatus, setting information held by the image forming apparatus in a case where the image forming apparatus is connected to the information processing apparatus, and receives, from the image forming apparatus, information indicating update content of setting information held by the image forming apparatus in a case where the setting information is updated after the image forming apparatus is connected to the information processing apparatus; and a transmitting unit configured to transmit, as a response to reception of setting information in a case where the image forming apparatus is connected to the information processing apparatus, a response to the image forming apparatus indicating whether to transmit information indicating update content from the image forming apparatus to the information processing apparatus in units of setting items.

Prior to the initial installation of a machine such as an image forming apparatus, it is conceivable to configure settings in an environment different from the machine to be actually installed, such as a reproducing environment that reproduces the actual machine, e.g., a cloud environment, and to reflect the settings onto the machine to be actually installed at the time of the initial installation of the machine. Here, for example, the machine may be shipped from the factory with settings that are adjusted from the initial settings. As above, in the case where the machine has settings different from the initial settings prior to the initial installation, if settings configured on the basis of the initial settings in an environment different from the machine to be actually installed are reflected onto the actual to-be-installed machine which is to be initialized, this reflection becomes, for example, one that disregards the settings changed upon shipment from the factory, and an inconvenience may arise.

SUMMARY

Aspects of non-limiting embodiments of the present disclosure relate to an information processing system, a non-transitory computer readable medium, and an information processing method capable of reflecting settings configured in an environment different from a machine to be actually installed onto a machine to be installed without causing any inconvenience.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including a processor configured to perform a process, the process including: holding, in a predetermined region, specific setting information that is setting information to be reflected onto a machine to be installed and that has been specified in an environment different from a machine to be actually set up; and, in reflecting the specific setting information onto the machine, in a case where it is determined that a conflict occurs between the specific setting information held in the predetermined region and setting information preconfigured on the machine, notifying a predetermined notification destination, receiving a command to resolve the conflict, and reflecting the conflict-resolved setting information onto the machine.

BRIEF DESCRIPTION OF THE DRAWINGS

An exemplary embodiment of the present disclosure will be described in detail based on the following figures, wherein:

FIG. 10 is a diagram illustrating an example of conflict data written to a conflict data section of the setting management server;

FIG. 11 is a diagram illustrating an example of update pending data and update requester information written to an update pending data section of the setting management server;

FIG. 12 is a diagram illustrating an example of setting data written to a setting data section of the setting management server;

DETAILED DESCRIPTION

Figure 1:
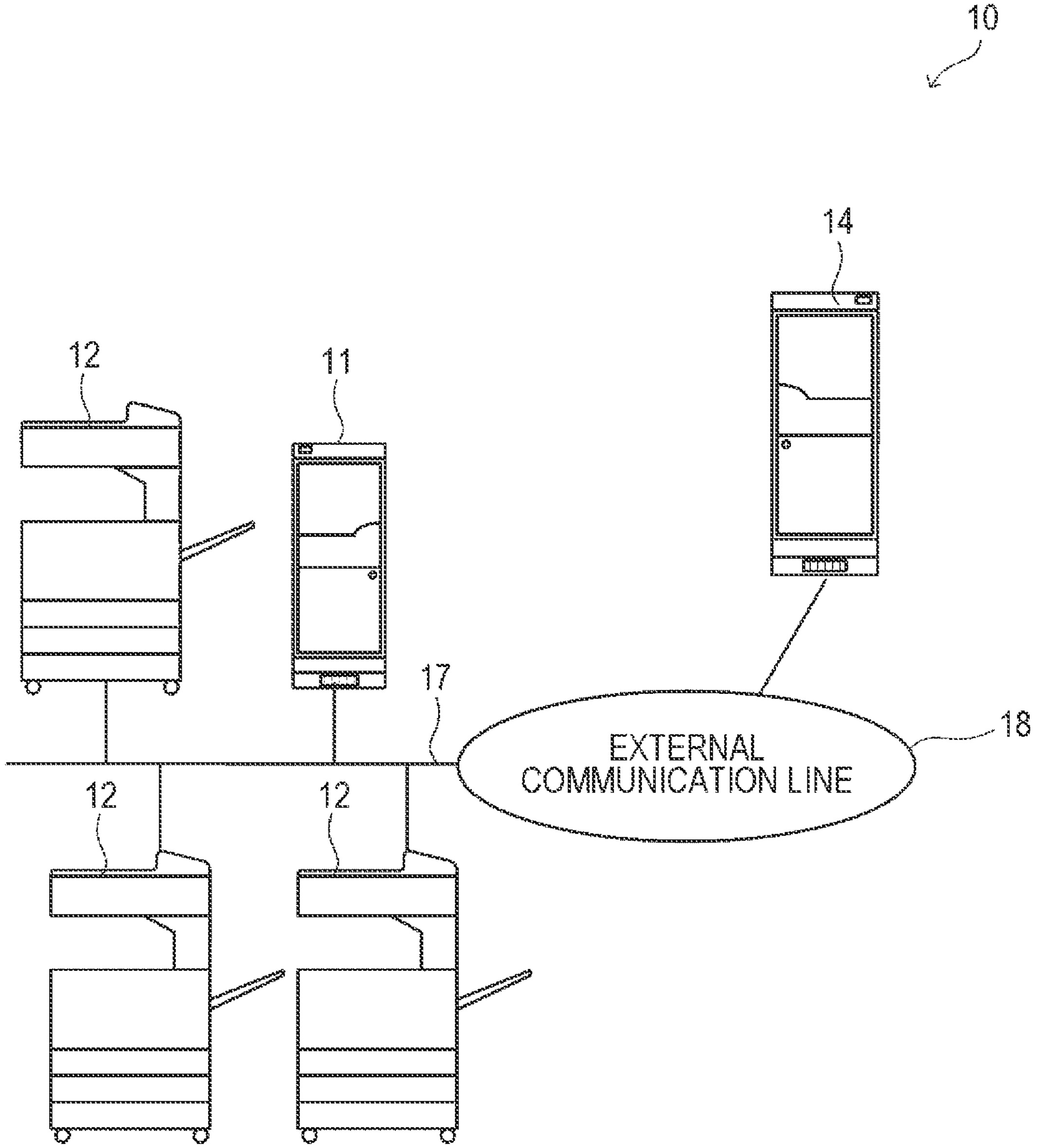
FIG. 1 is a diagram illustrating a schematic configuration of an image forming system according to an exemplary embodiment.

Hereinafter, an exemplary embodiment of the present disclosure will be described in detail with reference to the drawings. FIG. 1 is a diagram illustrating a schematic configuration of an image forming system according to the present exemplary embodiment. In the present exemplary embodiment, an image forming system 10 will be described as an example of an information processing system.

The image forming system 10 according to the present exemplary embodiment includes, as illustrated in FIG. 1, a local server 11, image forming devices 12, which are an example of a machine to be installed, and a cloud server 14. Although only one local server 11 and one cloud server 14 are illustrated in the present exemplary embodiment, multiple local servers 11 and multiple cloud servers 14 may be provided. Moreover, the local server 11 may be omitted.

The local server 11 and the image forming devices 12 are each connected to an internal communication line 17, such as a local area network (LAN) or an intranet. The internal communication line 17 and the cloud server 14 are each connected to an external communication line 18, such as a wide area network (WAN) or the Internet. The local server 11, the image forming devices 12, and the cloud server 14 are each configured to be able to transmit and receive various types of data to and from each other via the internal communication line 17 and the external communication line 18.

Figure 2:
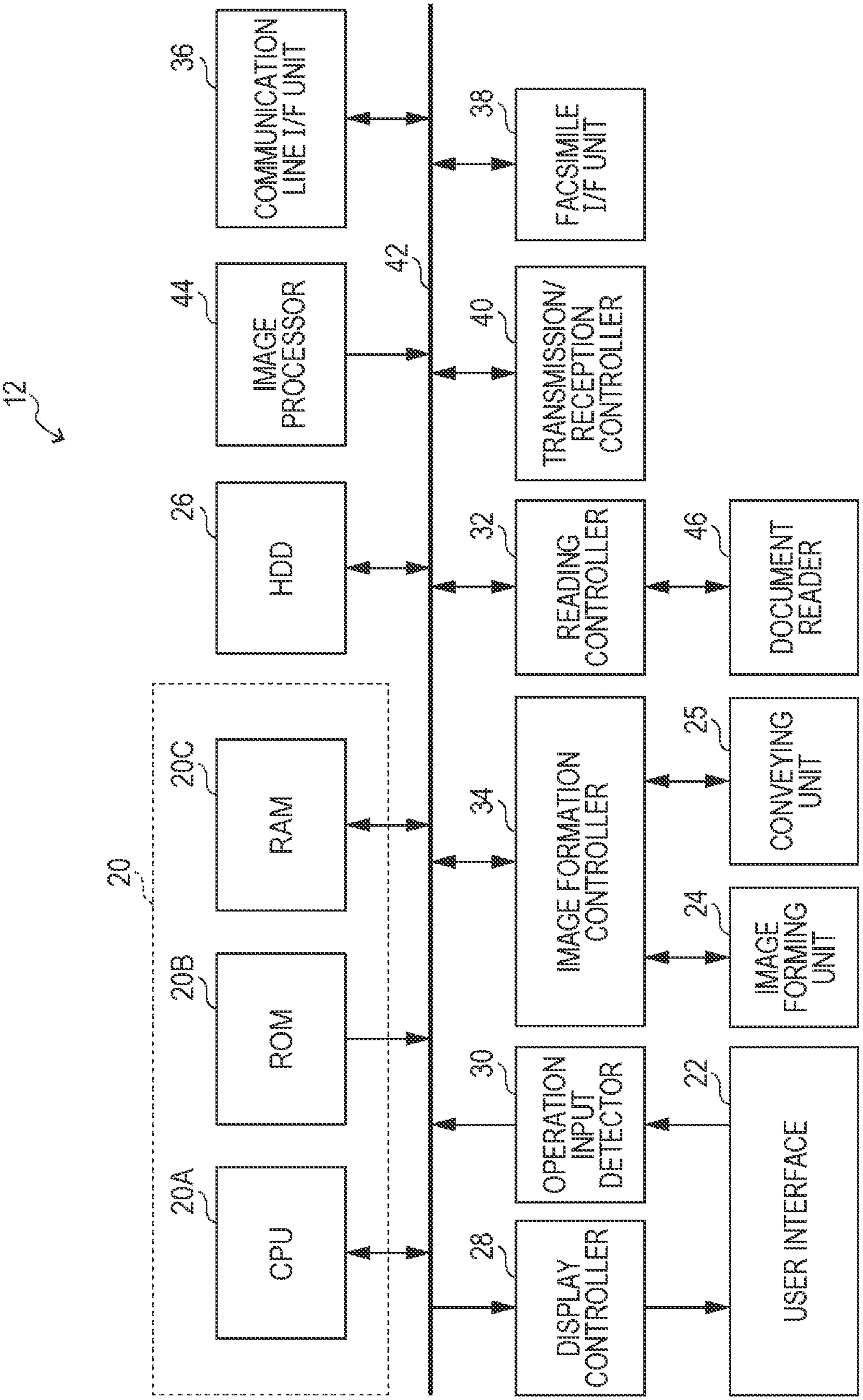
FIG. 2 is a block diagram illustrating the configuration of the principal parts of the electrical system of an image forming device in the image forming system according to the present exemplary embodiment.

FIG. 2 is a block diagram illustrating the configuration of the principal parts of the electrical system of one image forming device 12 in the image forming system 10 according to the present exemplary embodiment.

The image forming device 12 according to the present exemplary embodiment includes, as illustrated in FIG. 2, a control unit 20 including a central processing unit (CPU) 20A, a read-only memory (ROM) 20B, and a random-access memory (RAM) 20C. The CPU 20A controls the entire operation of the image forming device 12. The RAM 20C is used as a work area or the like when the CPU 20A executes various programs. The ROM 20B stores in advance various control programs, various parameters, and the like. In the image forming device 12, the units of the control unit 20 are electrically connected by a system bus 42.

The image forming device 12 according to the present exemplary embodiment also includes a hard disk drive (HDD) 26, which stores various types of data, application programs, and the like. The image forming device 12 further includes a display controller 28, which is connected to a user interface 22 and which controls the displaying of various operation screens and the like on a display of the user interface 22. Moreover, the image forming device 12 includes an operation input detector 30, which is connected to the user interface 22 and which detects operation commands input via the user interface 22. In the image forming device 12, the HDD 26, the display controller 28, and the operation input detector 30 are electrically connected to the system bus 42. Although an example in which the image forming device 12 according to the present embodiment includes the HDD 26 is described, this is not the only possible case, and the image forming device 12 may include a non-volatile memory such as a flash memory.

The image forming device 12 according to the present exemplary embodiment includes a reading controller 32, which controls an optical image reading operation performed by a document reader 46 and a document feed operation performed by a document feeder, and an image formation controller 34, which controls image formation processing performed by an image forming unit 24, and the conveyance of paper to the image forming unit 24 by a conveying unit 25. The image forming device 12 also includes a communication line interface (communication line I/F) unit 36, which is connected to the internal communication line 17 and which transmits and receives communication data to and from another device connected to the internal communication line 17, and an image processor 44, which performs various types of image processing. The image forming device 12 further includes a facsimile interface (facsimile I/F) unit 38, which is connected to an unillustrated phone line and which transmits and receives facsimile data to and from a facsimile machine connected to the phone line. The image forming device 12 also includes a transmission/reception controller 40, which controls the transmission and reception of facsimile data via the facsimile interface unit 38. In the image forming device 12, the transmission/reception controller 40, the reading controller 32, the image formation controller 34, the communication line interface unit 36, the facsimile interface unit 38, and the image processor 44 are electrically connected to the system bus 42.

With the above configuration, the image forming device 12 according to the present exemplary embodiment executes, using the CPU 20A, access to each of the RAM 20C, the ROM 20B, and the HDD 26. The image forming device 12 executes, using the CPU 20A, control of displaying of information such as operation screens and various messages on the display of the user interface 22 via the display controller 28. The image forming device 12 also executes, using the CPU 20A, control of the operation of the document reader 46 and the document feeder via the reading controller 32. In addition, the image forming device 12 executes, using the CPU 20A, each of control of the operation of the image forming unit 24 and the conveying unit 25 via the image formation controller 34, and control of the transmission and reception of communication data via the communication line interface unit 36. Moreover, the image forming device 12 executes, using the CPU 20A, control of the transmission and reception of facsimile data via the facsimile interface unit 38 by the transmission/reception controller 40. Furthermore, the image forming device 12 executes, using the CPU 20A, the grasping of the operation contents of the user interface 22 based on operation information detected by the operation input detector 30, and executes various types of control based on the operation contents.

Figure 3:
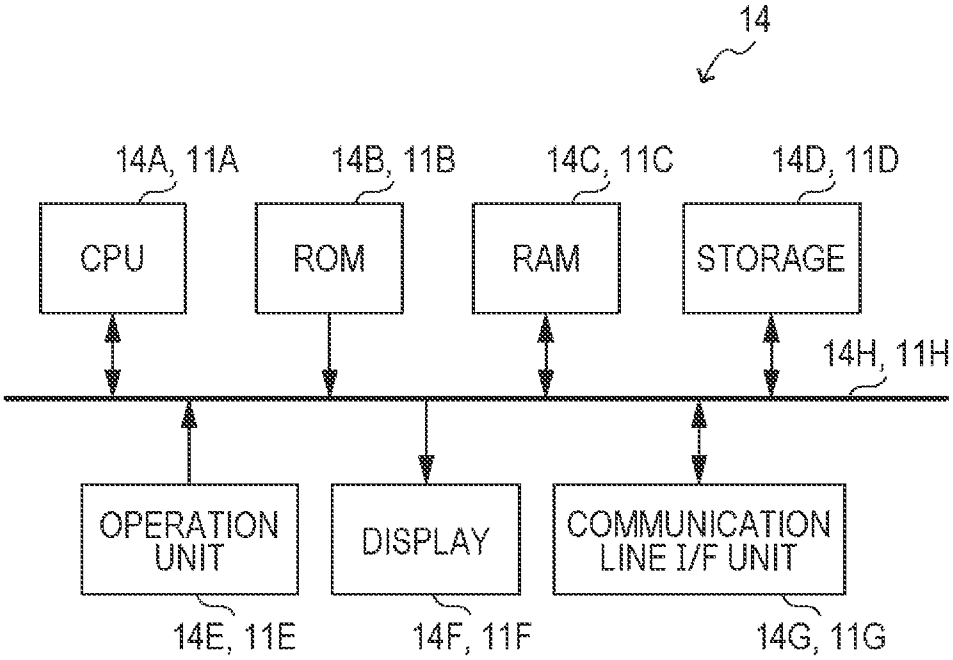
FIG. 3 is a block diagram illustrating the configuration of the principal parts of the electrical system of a local server and a cloud server according to the present exemplary embodiment.

Next, the configuration of the principal parts of the electrical system of the local server 11 and the cloud server 14 in the image forming system 10 according to the present exemplary embodiment will be described. FIG. 3 is a block diagram illustrating the configuration of the principal parts of the electrical system of the local server 11 and the cloud server 14 according to the present exemplary embodiment. Because the local server 11 and the cloud server 14 are basically assumed to have the configuration of a general computer, the cloud server 14 will be described as a representative while omitting the description of the local server 11, and only corresponding symbols are indicated in FIG. 3.

The cloud server 14 according to the present exemplary embodiment includes, as illustrated in FIG. 3, a CPU 14A, a ROM 14B, a RAM 14C, a storage 14D, an operation unit 14E, a display 14F, and a communication line interface (I/F) unit 14G. The CPU 14A controls the entire operation of the cloud server 14. The ROM 14B stores in advance information processing programs for performing various types of control, various parameters, and the like. The RAM 14C is used as a work area or the like when the CPU 14A executes various programs. The storage 14D stores various types of data, application programs, and the like. The operation unit 14E is used to input various types of information. The display 14F is used to display various types of information. The communication line interface unit 14G is connected to the external communication line 18, and transmits and receives various types of data to and from another device connected to the external communication line 18. The above units of the cloud server 14 are electrically connected to each other by a system bus 14H. Although the cloud server 14 according to the present exemplary embodiment includes the storage 14D as a memory, a non-volatile memory such as an HDD or a flash memory is applied as the storage 14D. Note that the communication line interface unit 11G of the local server 11 is connected to the internal communication line 17 and transmits and receives various types of data to and from another device connected to the internal communication line 17.

With the above configuration, the cloud server 14 according to the present exemplary embodiment executes, using the CPU 14A, access to the ROM 14B, the RAM 14C, and the storage 14D, obtaining of various types of data via the operation unit 14E, and displaying of various types of information on the display 14F. In addition, the cloud server 14 executes, using the CPU 14A, control of the transmission and reception of communication data via the communication line interface unit 14G.

The local server 11 configured as described above has the function of a managed print service (MPS) which manages multiple image forming devices 12. Note that the local server 11 may be referred to as the MPS 11 with the same reference numerals. Moreover, the image forming device 12 may be referred to as the real device 12 with the same reference numerals.

Figure 4:
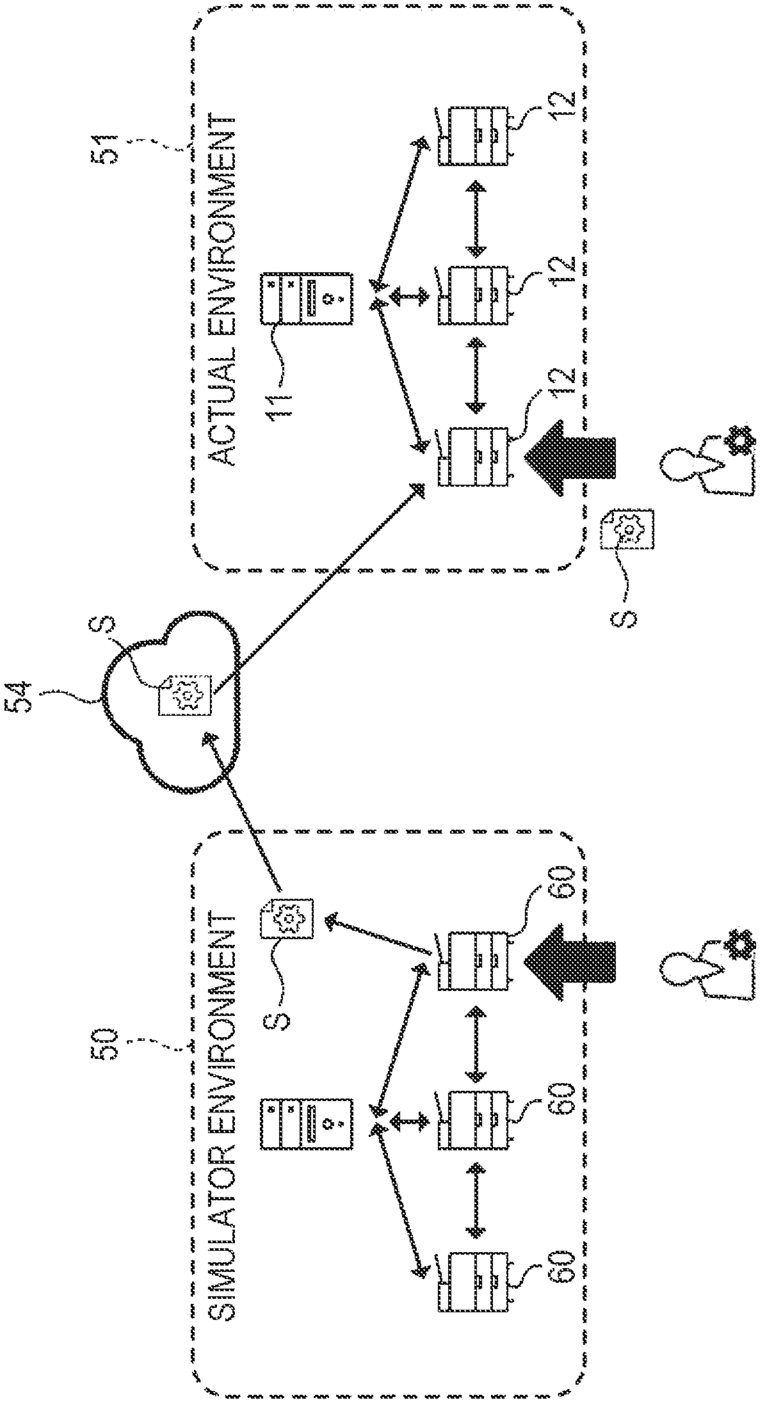
FIG. 4 is a diagram illustrating a situation in which the settings of the image forming device are configured in a simulator environment and reflected onto the actual image forming device.

As illustrated in FIG. 4, the cloud server 14 also functions as a simulator environment 50, which configures the settings of each image forming device 12 using a virtual device 60 virtually reproducing the image forming device 12, and as a setting management server 54, which reflects setting information configured in the simulator environment 50 onto the real device 12 in a real environment 51. Although it is described in the present exemplary embodiment that the single cloud server 14 has the functions of both the simulator environment 50 and the setting management server 54, the functions may be provided as functions of separate servers.

In the image forming system 10 according to the present exemplary embodiment, for example, as illustrated in FIG. 4, a vendor of the image forming devices 12 performs verification of the customer-specific settings at the delivery destination in the simulator environment 50, and registers verified setting information S into the setting management server 54. Note that FIG. 4 is a diagram illustrating a situation in which the settings of the image forming devices 12 are configured in the simulator environment 50 and reflected onto the actual image forming devices 12.

Then, the verified setting information S of the image forming devices 12 is downloaded from the setting management server 54 or is directly imported by the vendor and reflected onto the real devices 12, which allows the image forming devices 12 to be immediately operational.

However, a setting conflict may occur between the simulator environment 50 and the actual image forming devices 12, and a malfunction may occur if the settings of only one side are adopted. For example, a machine may be shipped from the factory with settings that are adjusted from the initial settings. As above, in the case where a machine has settings different from the initial settings before the initial installation, if the settings configured on the basis of the initial settings in the simulator environment 50, which is different from the image forming device 12 to be actually installed, are reflected onto the actual to-be-installed machine which is to be initialized, this reflection becomes, for example, one that disregards the settings changed upon shipment from the factory, and an inconvenience may arise.

Figure 5:
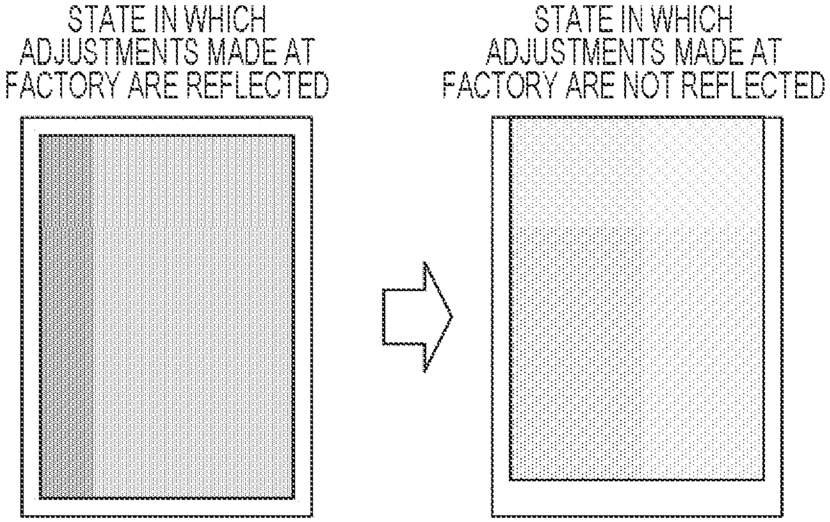
FIG. 5 is a diagram for describing an example of a malfunction caused by changing the settings changed at the factory back to the default settings.

Specifically, the actual image forming devices 12 are adjusted at the assembly factory, and setting values that reflect the adjustment result are configured, while the characteristic values of sensors are configured. In the meantime, for settings configured by a vendor of the image forming devices 12 in the simulator environment 50, default values are applied, instead of changing the configuration of setting values adjusted at the assembly factory or the sensor characteristics. Then, if the setting information configured in the simulator environment 50 is reflected onto the actual image forming devices 12, the setting values configured at the factory are overwritten with the default values, and an inconvenience arises. For example, as illustrated in FIG. 5, the state in which the adjustments made at the factory are reflected becomes the state in which the adjustments made at the factory are not reflected, and, if printing is performed, image quality problems occur, such as the formed image protruding from the paper or having a light density.

Accordingly, in the image forming system 10 according to the present exemplary embodiment, a process is performed including: holding, in a predetermined region, specific setting information, which is setting information to be reflected onto the image forming device 12 to be installed and which has been specified in an environment different from the image forming device 12 to be actually set up; and, in reflecting the specific setting information onto the image forming device 12, in the case where it is determined that a conflict occurs between the specific setting information held in the predetermined region and setting information preconfigured on the image forming device 12, notifying a predetermined notification destination, receiving a command to resolve the conflict, and reflecting the conflict-resolved setting information onto the image forming device 12. Note that an example of the different environment corresponds to the simulator environment 50 (see FIG. 6), which will be described later, in the present exemplary embodiment. Also, being "different" includes not only the level of being a different device or being cloud rather than being a real device, for example, but also includes the state where, although the device may be the same device, the device has at least one different setting. Specifically, the above includes cases in which settings are configured in advance using a device to be delivered. In this case, the Internet Protocol (IP) address is automatically assigned by the Dynamic Host Configuration Protocol (DHCP) and is thus different, but the rest is almost identical.

Figure 6:
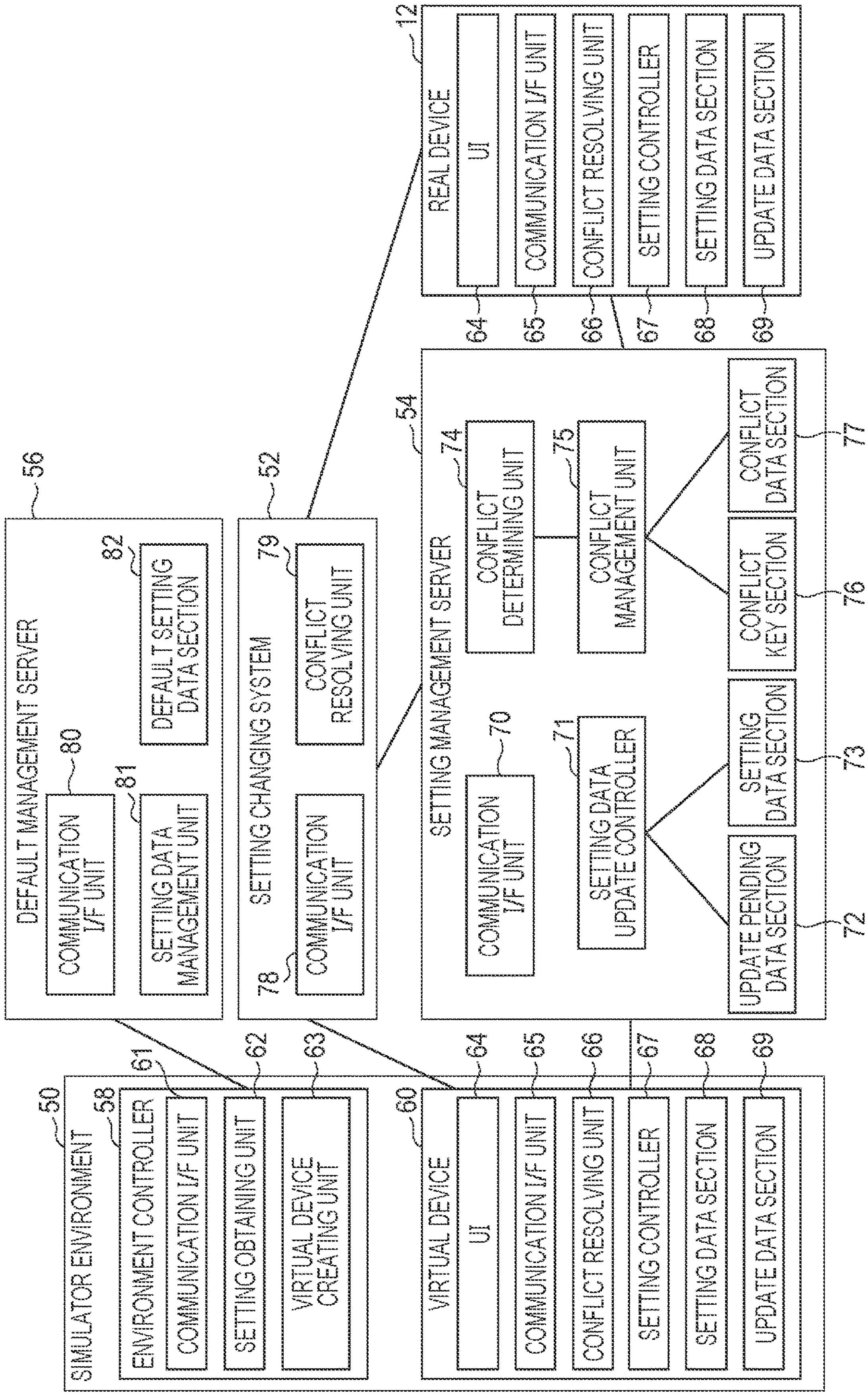
FIG. 6 is a functional block diagram illustrating the functional configuration of the image forming system according to the present exemplary embodiment.

Next, a functional configuration for performing the above-described processing in the image forming system 10 according to the present exemplary embodiment will be described. FIG. 6 is a functional block diagram illustrating the functional configuration of the image forming system 10 according to the present exemplary embodiment.

The image forming system 10 according to the present exemplary embodiment includes the functions of the simulator environment 50 as a reproducing environment, the setting management server 54, a setting changing system 52, a default management server 56, and the real device 12. Note that the simulator environment 50, the setting management server 54, the setting changing system 52, and the default management server 56 may be functions provided by the single cloud server 14; alternatively, at least one of the functions may be provided by another server, or each of the functions may be provided by a different server. In the present exemplary embodiment, it is described that the simulator environment 50, the setting management server 54, and the default management server 56 are functions provided by the cloud server 14, and the setting changing system 52 is a function provided by the local server (MPS) 11.

The simulator environment 50 has the functions of an environment controller 58 and the virtual device 60, and the environment controller 58 creates the virtual device 60 virtually reproducing the image forming device 12 as a virtual environment different from the image forming device 12. The virtual device 60 created by the environment controller 58 performs processing to verify the customer-specific settings at the delivery destination of the image forming device 12 and to register the verified setting information into the setting management server 54.

The environment controller 58 has the functions of a communication I/F unit 61, a setting obtaining unit 62, and a virtual device creating unit 63.

The communication I/F unit 61 communicates with the default management server 56 to transmit and receive various types of data such as default setting data.

The setting obtaining unit 62 obtains the default setting data of the image forming device 12, which is to be simulated, from the default management server 56 via the communication I/F unit 61.

The virtual device creating unit 63 creates the virtual device 60, which is the virtual image forming device 12 to which the default setting data obtained by the setting obtaining unit 62 is applied.

The virtual device 60 has the functions of a user interface (UI) 64, a communication I/F unit 65, a conflict resolving unit 66, a setting controller 67, a setting data section 68, and an update data section 69.

The UI 64 displays setting information when verifying the settings of the virtual device 60, receives setting values, and so on.

The communication I/F unit 65 communicates with the setting changing system 52 to transmit and receive various types of data such as setting information.

On receipt of a notification of update success from the setting management server 54, the conflict resolving unit 66 empties the update data section 69, changes the setting data based on the obtained data, and stores the changed setting content in the setting data section 68.

The setting controller 67 controls the operation of the virtual device 60 in accordance with the setting values received by the UI 64. For example, in the case where the settings are changed, the setting controller 67 stores the changed setting content in the setting data section 68, and also adds to the update data section 69 the change content to be transmitted to the setting management server 54.

The setting data section 68 is a region for storing the setting values received by the UI 64, and the update data section 69 is a region for storing the updated setting values and so on.

The setting management server 54 has the functions of a communication I/F unit 70, a setting data update controller 71, an update pending data section 72 as an example of a predetermined region, a setting data section 73, a conflict determining unit 74, a conflict management unit 75, a conflict key section 76, and a conflict data section 77.

The communication I/F unit 70 communicates with the virtual device 60, the setting changing system 52, and the virtual device 12 to transmit and receive various types of data.

On receipt of setting information, the setting data update controller 71 controls the storage to the update pending data section 72 and the storage to the setting data section 73 in accordance with the transmission source of the setting information. For example, on receipt of setting information from the real device 12, the setting information is stored in the setting data section 73. In contrast, on receipt of setting information from the simulator environment 50 or the setting changing system 52, the setting information is stored in the update pending data section 72 instead of being stored in the setting data section 73, and, after the end of a conflict determination, the setting information is stored in the setting data section 73.

The update pending data section 72 is a region for storing change content of setting information, transmitted from the simulator environment 50 or the setting changing system 52, and the setting data section 73 is a region for storing setting information.

The conflict determining unit 74 determines whether a conflict occurs between setting information received from the real device 12 and setting information received from the simulator environment 50 or the setting changing system 52 by determining whether these items of setting information are inconsistent.

In the case where it is determined by the conflict determining unit 74 that a conflict is occurring, the conflict management unit 75 creates a conflict key for identifying the conflict, stores the conflict key in the conflict key section 76, and stores the conflict data in the conflict data section 77.

The conflict key section 76 is a storage region for storing a conflict key created by the conflict management unit 75, and the conflict data section 77 is a storage region for storing conflict data.

The setting changing system 52 has the function of a communication I/F unit 78 and a conflict resolving unit 79.

The communication I/F unit 78 communicates with the simulator environment 50, the setting management server 54, and the real device 12 to transmit and receive various types of data.

In the case of configuring the settings of multiple devices, if a similar conflict occurs, the conflict resolving unit 79 stores the result of selecting setting information configured first as specific setting information, and, if a similar conflict occurs in another device, set up this other device in accordance with rules set first.

The default management server 56 has the functions of a communication I/F unit 80, a setting data management unit 81, and a default setting data section 82.

The communication I/F unit 80 communicates with the simulator environment 50 to transmit and receive various types of data such as default setting data.

In response to a request from the simulator environment 50, the setting data management unit 81 reads the default setting data of a corresponding model from the default setting data section 82, and transmits the default setting data to the simulator environment 50.

The default setting data section 82 is a storage region for storing default setting data which is determined in advance for each model.

The real device 12 has the functionality that is the same as or similar to the virtual device 60 in the simulator environment 50. That is, the real device 12 has the functions of the UI 64, the communication I/F unit 65, the conflict resolving unit 66, the setting controller 67, the setting data section 68, and the update data section 69. Each function is the same as or similar to that of the virtual device 60 in the simulator environment 50, and a description thereof is omitted.

That is, with each function described above, in the image forming system 10 according to the present exemplary embodiment, a process is performed including: holding setting information specified in the simulator environment 50 in the update pending data section 72; and, in reflecting the setting information onto the real device 12, in the case where it is determined that a conflict occurs between the setting information held in the update pending data section 72 and setting information preconfigured on the image forming device 12, notifying a predetermined notification destination, receiving a command to resolve the conflict, and reflecting the conflict-resolved setting information onto the real device 12.

Specifically, in the image forming system 10 according to the present exemplary embodiment, each part performs processing in processes 1 to 6 below. The details of processes 1 to 6 will be described later.

The virtual device 60 and the real device 12 perform a process of receiving a setting change (process 1) and a process of synchronizing with the setting management server 54 (process 2).

The setting management server 54 performs a process of receiving a data update notification (process 3), a process of receiving a data obtaining request (process 4), and a process of determining a data conflict (process 5).

In addition, the setting data update source (virtual device 60, real device 12, and setting changing system 52) performs a process of receiving a conflict notification (process 6). The chronological flow in the major cases is as follows.

In the case where there is no update data, the flow is as follows: process 2 (request the setting management server 54 to obtain update pending data)→process 4 (respond to the device with the update pending data)→process 2 (end). Hereinafter, this is abbreviated as "obtain the update pending data".

In the case where there is no update data and there is a conflict, the flow is as follows: process 2→process 4 (respond to the device that the obtaining of data failed due to a conflict)→process 2 (the device enters a sync request waiting state)→process 6 (transmit a conflict-resolved data update notification to the setting management server 54)→process 3 (the server receives the data update notification)→"obtain the update pending data". Note that "obtain the update pending data" is unnecessary when process 6 is performed by the real device 12.

In the case where there is update data and there is no conflict, the flow is as follows: process 1→process 2 (transmit a data update notification to the setting management server 54)→process 3 (receive the data update notification)→process 5 (no conflict)→process 3 (respond that the update is successful)→"obtain the update pending data".

In the case where there is update data and there is a conflict, the flow is as follows: the flow process 1→process 2→process 3 is the same as the flow when there is no conflict; process 1→process 2→process 3→process 5 (there is a conflict)→process 3 (respond that the update failed due to a conflict)→process 2 (empty the update data, and enter a sync request waiting state)→process 6→"obtain the update pending data". Note that "obtain the update pending data" is unnecessary when process 6 is performed by the real device 12.

Next, the flow of the specific processing in processes 1 to 6 described above, performed by each part of the image forming system 10 according to the present exemplary embodiment, will be described.

Figure 7:
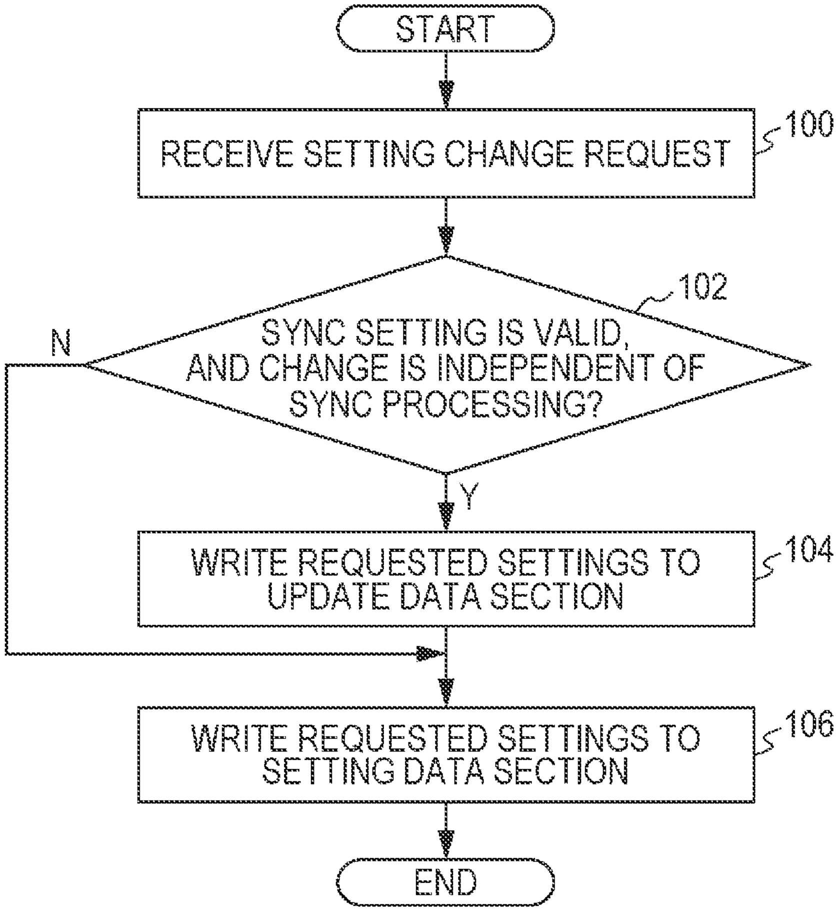
FIG. 7 is a flowchart illustrating an example of the flow of a process of receiving a setting change, which is process 1, performed by a virtual device and a real device.

First, F the process of receiving a setting change, which is process 1 described above, will be described. FIG. 7 is a flowchart illustrating an example of the flow of the process of receiving a setting change, which is process 1, performed by the virtual device 60 and the real device 12. Since the process is a process performed by both the virtual device 60 and the real device 12, the process will be described below as a process performed representatively by the virtual device 60.

In step 100, the virtual device 60 receives a setting change request, and moves to step 102. That is, the UI 64 receives a setting change request.

In step 102, the virtual device 60 determines whether the sync setting is valid and whether the change is independent of sync processing. In the case where the determination is affirmative, the virtual device 60 moves to step 104, and, in the case where the determination is negative, the virtual device 60 moves to step 106. Note that a change that depends on sync processing is a process of reflecting data of the setting management server 54, and a process of reflecting a conflict resolution onto values selected by the device.

In step 104, the virtual device 60 writes the requested setting to the update data section 69 and moves to step 106.

In step 106, the virtual device 60 writes the requested setting to the setting data section 68 and ends the series of processes.

Figure 8:
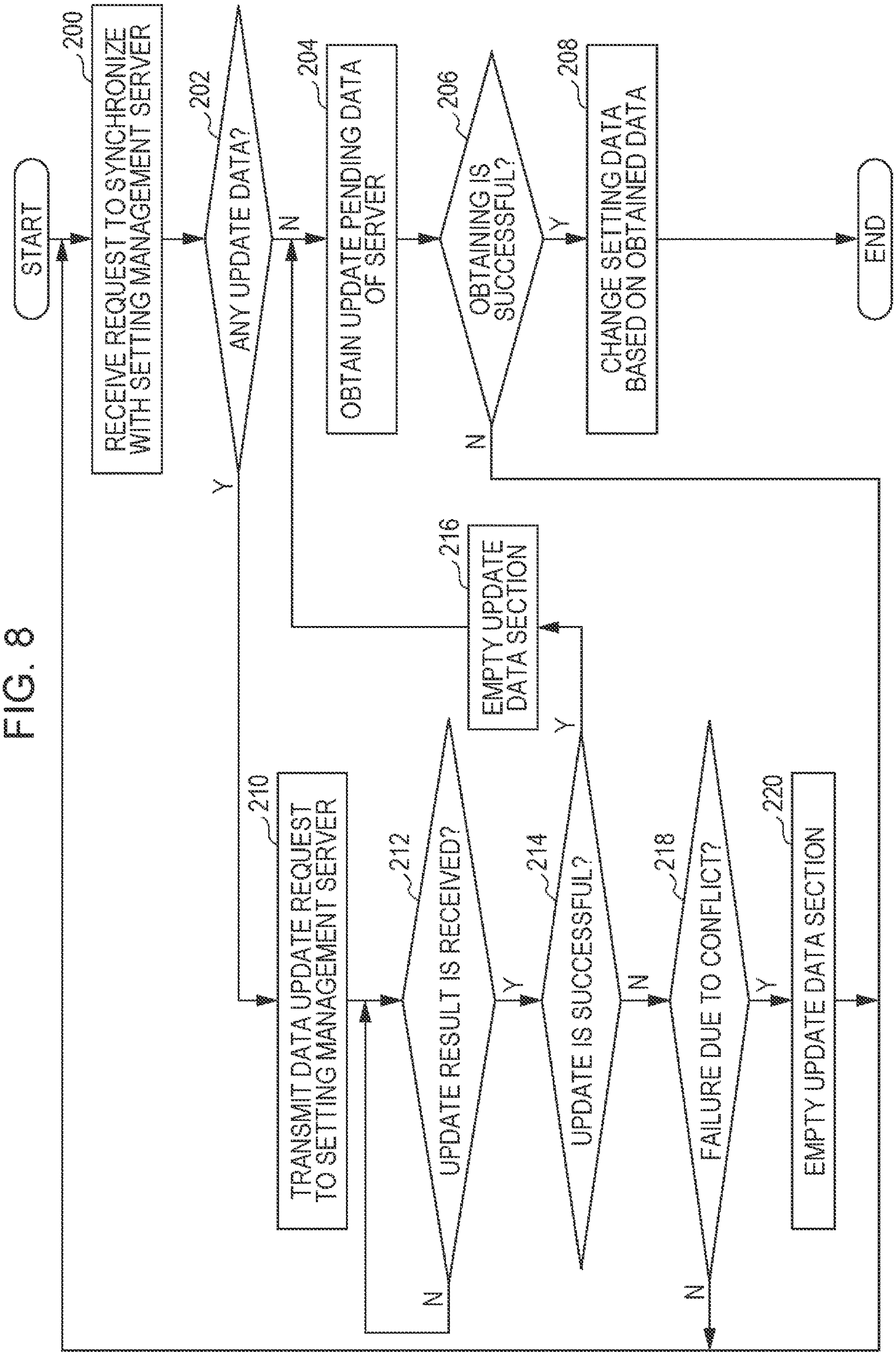
FIG. 8 is a flowchart illustrating an example of the flow of a process of synchronizing with a setting management server, which is process 2, performed by the virtual device and the real device.

Next, the process of synchronizing with the setting management server 54, which is process 2 descried above, will be described. FIG. 8 is a flowchart illustrating an example of the flow of the process of synchronizing with the setting management server 54, which is process 2, performed by the virtual device 60 and the real device 12. Since the process is a process performed by both the virtual device 60 and the real device 12, the process will be described below as a process performed representatively by the virtual device 60.

In step 200, the virtual device 60 receives a request to synchronize with the setting management server 54, and moves to step 202.

In step 202, the virtual device 60 determines whether there is update data. That is, the virtual device 60 determines whether update data is stored in the update data section 69. In the case where the determination is negative, the virtual device 60 moves to step 204, and, in the case where the determination is affirmative, the virtual device 60 moves to step 210.

In step 204, the virtual device 60 obtains update pending data of the setting management server 54, and moves to step 206.

In step 206, the virtual device 60 determines whether the obtaining of update pending data has been successful. In the case where the determination is affirmative, the virtual device 60 moves to step 208, and, in the case where the determination is negative, the virtual device 60 returns to step 200, and repeats the process described above.

In step 208, the virtual device 60 changes the setting data based on the obtained data, and ends the series of processes.

In contrast, in step 210, the virtual device 60 transmits a data update request to the setting management server 54, and moves to step 212.

In step 212, the virtual device 60 determines whether the update result has been received from the setting management server 54. The virtual device 60 waits until the determination is affirmative, and then moves to step 214.

In step 214, the virtual device 60 determines whether the update has been successful. In the case where the determination is affirmative, the virtual device 60 moves to step 216, and, in the case where the determination is negative, the virtual device 60 moves to step 218.

In step 216, the virtual device 60 empties the update data section 69, and moves to step 204 described above.

In contrast, in step 218, the virtual device 60 determines whether the result is a failure due to a conflict. In the case where the determination is negative, the virtual device 60 returns to step 200 and repeats the process described above, and, in the case where the determination is affirmative, the virtual device 60 moves to step 220.

In step 220, the virtual device 60 empties the update data section 69, returns to step 200, and repeats the process described above.

Figure 9:
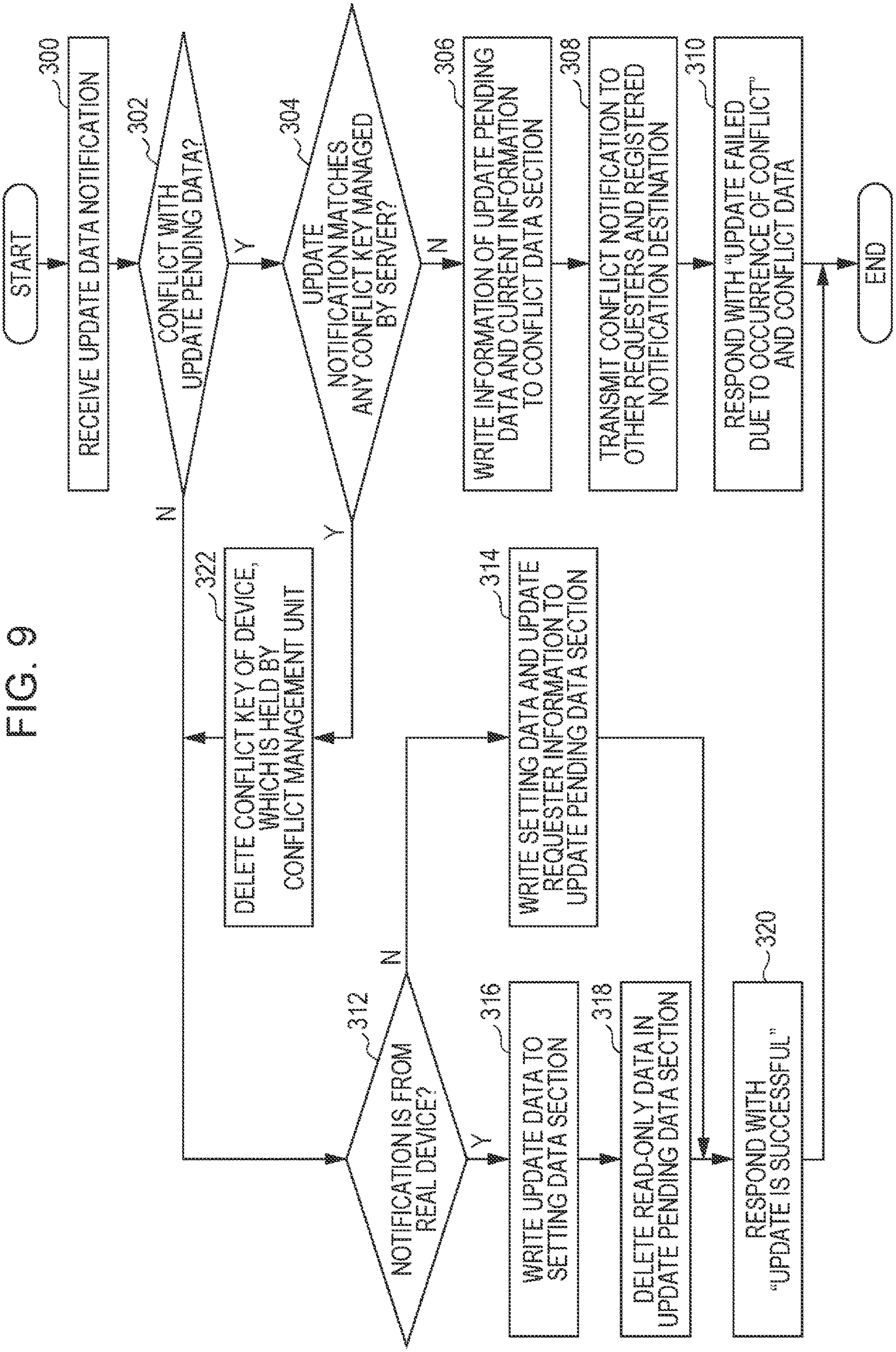
FIG. 9 is a flowchart illustrating an example of the flow of a process of receiving a data update notification, which is process 3, performed by the setting management server.

Next, the process of receiving a data update notification, which is process 3, will be described. FIG. 9 is a flowchart illustrating an example of the flow of the process of receiving a data update notification, which is process 3, performed by the setting management server 54.

In step 300, the setting management server 54 receives an update data notification, and moves to step 302. Specifically, the setting data update controller 71 receives an update data notification from the virtual device 60, the real device 12, or the setting changing system 52. As an update data notification, for example, {"A": 1} is received as a notification indicating that setting A has been updated to "1". Note that, in the case of Hypertext Transfer Protocol (HTTP), for example, information on the requester of an update data notification is obtained from meta data such as the user agent, IP address, or the like written in the header.

In step 302, the setting management server 54 determines whether there is a conflict with update pending data. As the determination, the setting data update controller 71 determines whether update pending data stored in the update pending data section 72 is inconsistent with setting data stored in the setting data section 73. In the case where the determination is affirmative, the setting management server 54 moves to step 304, and, in the case where the determination is negative, the setting management server 54 moves to step 312.

In step 304, the setting management server 54 determines whether there is an update notification that matches a conflict key managed by the setting management server 54. In the case where there is no match with the conflict key and the determination is negative, the setting management server 54 moves to step 306, and, in the case where the determination is affirmative, the setting management server 54 moves to step 322.

In step 306, the setting management server 54 writes the information of the update pending data and the current information in the conflict data section 77, and moves to step 308. FIG. 10 illustrates an example of conflict data written to the conflict data section 77 of the setting management server 54. FIG. 10 illustrates an example in which a conflict occurs in setting A between the real device 12 and the virtual device 60, and the conflict key is set to 1.

In step 308, the setting management server 54 transmits a conflict notification to other requesters of conflict data and to a registered notification destination, and moves to step 310.

In step 310, the setting management server 54 responds with "update failed due to the occurrence of a conflict" and the conflict data, and ends the series of processes.

In contrast, when the determination in step 302 is negative and the setting management server 54 moves to step 312, in step 312, the setting management server 54 determines whether the notification is a notification from the real device 12. In the case where the determination is negative, the setting management server 54 moves to step 314, and, in the case where the determination is affirmative, the setting management server 54 moves to step 316.

In step 314, the setting management server 54 writes the setting data and the update requester information to the update pending data section 72, and moves to step 320. FIG. 11 illustrates an example of update pending data and update requester information written to the update pending data section 72 of the setting management server 54. In the example of FIG. 11, an example is illustrated in which the virtual device 60 writes "2" to the update pending data section 72 as the value of setting A for the device ID "000001"; the MPS 11 writes "true" to the update pending data section 72 as setting B for the device ID "000001"; and the MPS 11 writes "true" to the update pending data section 72 as setting B for the device ID "000002".

In step 316, the setting management server 54 writes the received update data to the setting data section 73, and moves to step 318. FIG. 12 illustrates an example of setting data written to the setting data section 73 of the setting management server 54. In the example of FIG. 12, an example is illustrated in which "1" is written as setting A, "false" as setting B, and "5" as setting C for the device ID "000001", and "1" is written as setting A for the device ID "000002".

In step 318, the setting management server 54 deletes the read-only data in the update pending data section 72, and moves to step 320. Note that read-only data is not a setting that can be changed later as a setting item, but rather a setting that dynamically changes depending on the state of the real device 12, such as whether a hard disk drive is connected.

In step 320, the setting management server 54 responds with "update is successful", and ends the series of processes.

In contrast, when the determination in step 304 is affirmative and the setting management server 54 moves to step 322, in step 322, the setting management server 54 deletes the conflict key of the device, which is held by the conflict management unit 75, and moves to step 312 described above. Along with the deletion of the conflict key, the conflict data corresponding to the conflict key is also deleted.

Figure 13:
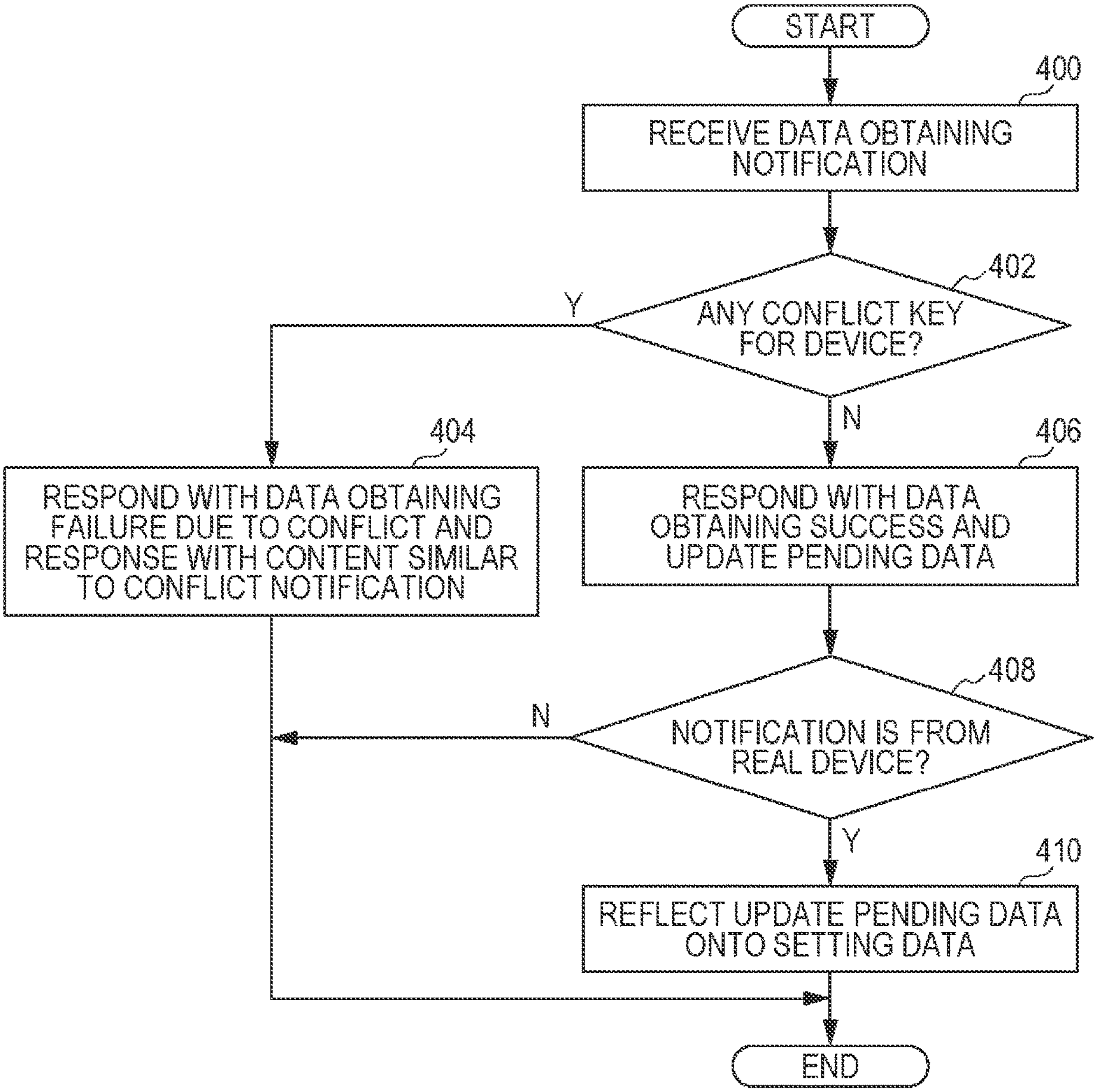
FIG. 13 is a flowchart illustrating an example of the flow of a process of receiving a data obtaining request, which is process 4, performed by the setting management server.

Next, the process of receiving a data obtaining request, which is process 4, will be described. FIG. 13 is a flowchart illustrating an example of the flow of the process of receiving a data obtaining request, which is process 4, performed by the setting management server 54.

In step 400, the setting management server 54 receives a data obtaining notification, and moves to step 402.

In step 402, the setting management server 54 determines whether there is a conflict key for the device. In the case where the determination is affirmative, the setting management server 54 moves to step 404, and, in the case where there is no conflict key and the determination is negative, the setting management server 54 moves to step 406.

In step 404, the setting management server 54 responds with a data obtaining failure due to a conflict and content similar to a conflict notification, and ends the series of processes.

In contrast, in step 406, the setting management server 54 responds with a data obtaining success and update pending data, and moves to step 408.

In step 408, the setting management server 54 determines whether the notification is a notification from the real device 12. In the case where the determination is negative, the setting management server 54 ends the series of processes, and, in the case where the determination is affirmative, the setting management server 54 moves to step 410.

In step 410, the setting management server 54 reflects the update pending data onto the setting data, and ends the series of processes.

Figure 14:
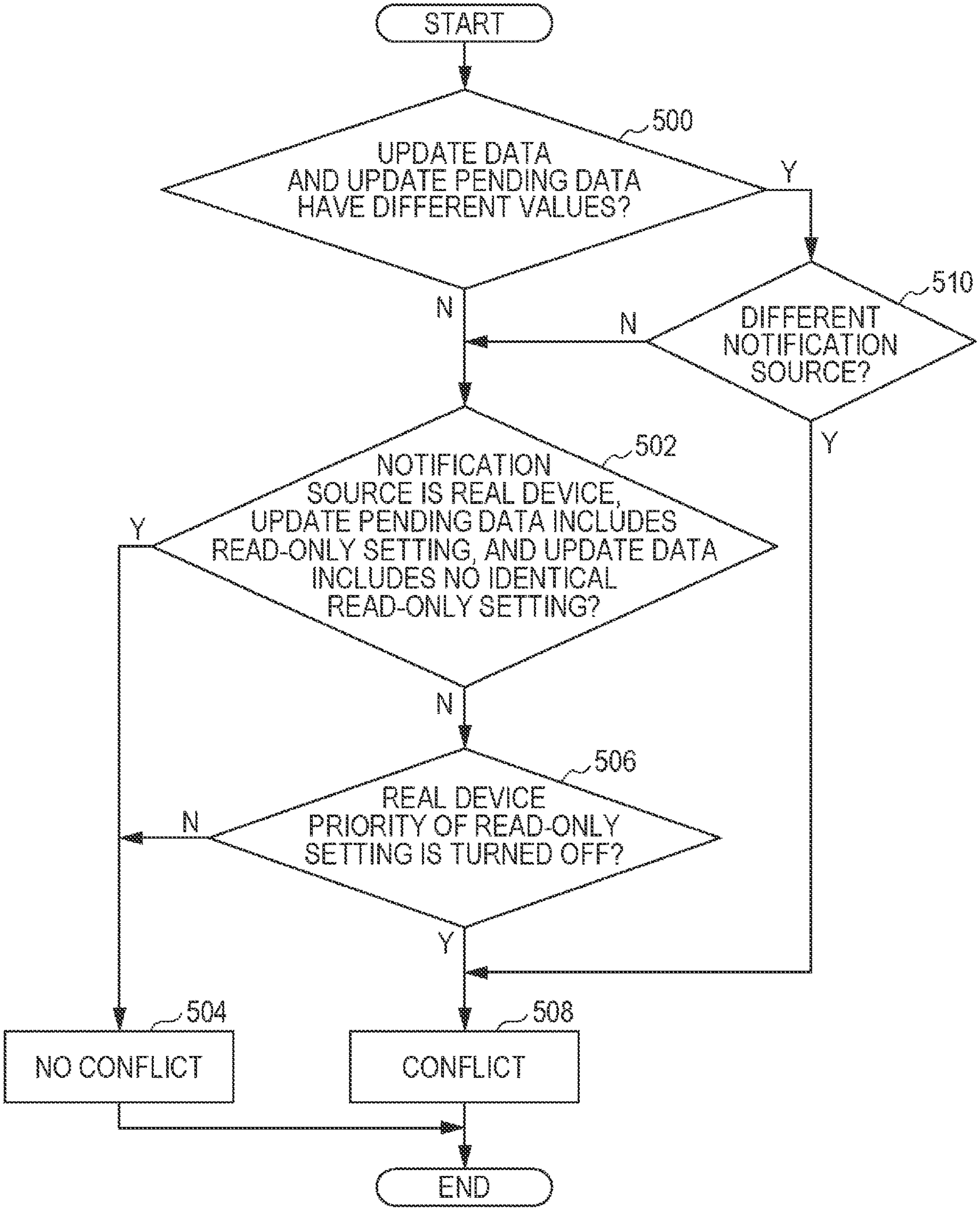
FIG. 14 is a flowchart illustrating an example of the flow of a process of determining a data conflict, which is process 5, performed by the setting management server.

Next, the process of determining a data conflict, which is process 5, will be described. FIG. 14 is a flowchart illustrating an example of the flow of the process of determining a data conflict, which is process 5, performed by the setting management server 54.

In step 500, the setting management server 54 determines whether the value of update data and the value of update pending data are different. In the case where update data and update pending data are the same and the determination is negative, the setting management server 54 moves to step 502, and, in the case where the determination is affirmative, the setting management server 54 moves to step 510.

In step 502, the setting management server 54 determines whether the notification source is the real device 12, the update pending data includes a read-only setting, and the update data does not include the same read-only setting. In the case where the determination is affirmative, the setting management server 54 moves to step 504, and, in the case where the determination is negative, the setting management server 54 moves to step 506.

In step 504, the setting management server 54 determines that there is no conflict, and ends the series of processes.

In contrast, in step 506, the setting management server 54 determines whether the real device priority of the read-only setting is turned off. In the case where the determination is negative, the setting management server 54 moves to step 504 described above, and, in the case where the determination is affirmative, the setting management server 54 moves to step 508.

In step 508, the setting management server 54 determines that there is a conflict, and ends the series of processes. In step S510, the setting management server 54 determines whether the notification sources are different. In the case where the determination is affirmative, the setting management unit 54 moves to step 508, and, in the case where the determination is negative, the setting management unit 54 moves to step 502.

Figure 15:
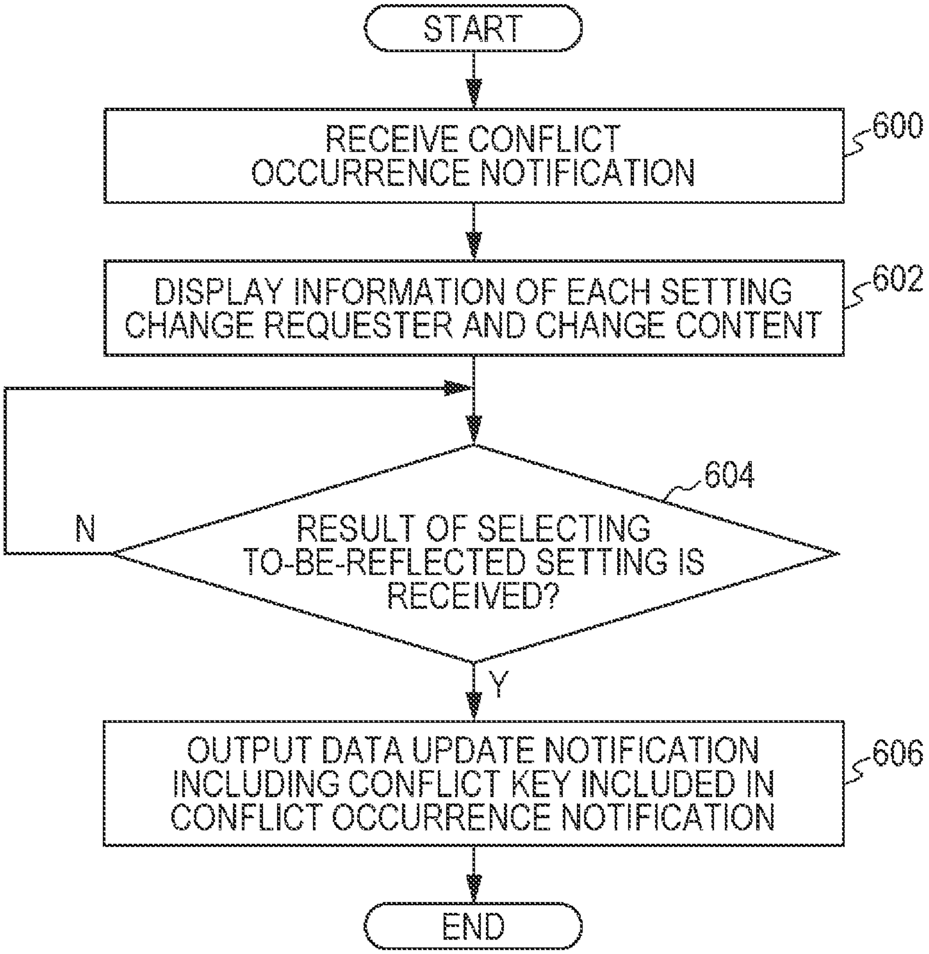
FIG. 15 is a flowchart illustrating an example of the flow of a process of receiving a conflict notification, which is process 6, performed by the virtual device, the real device, and the setting management server.
Figure 16:
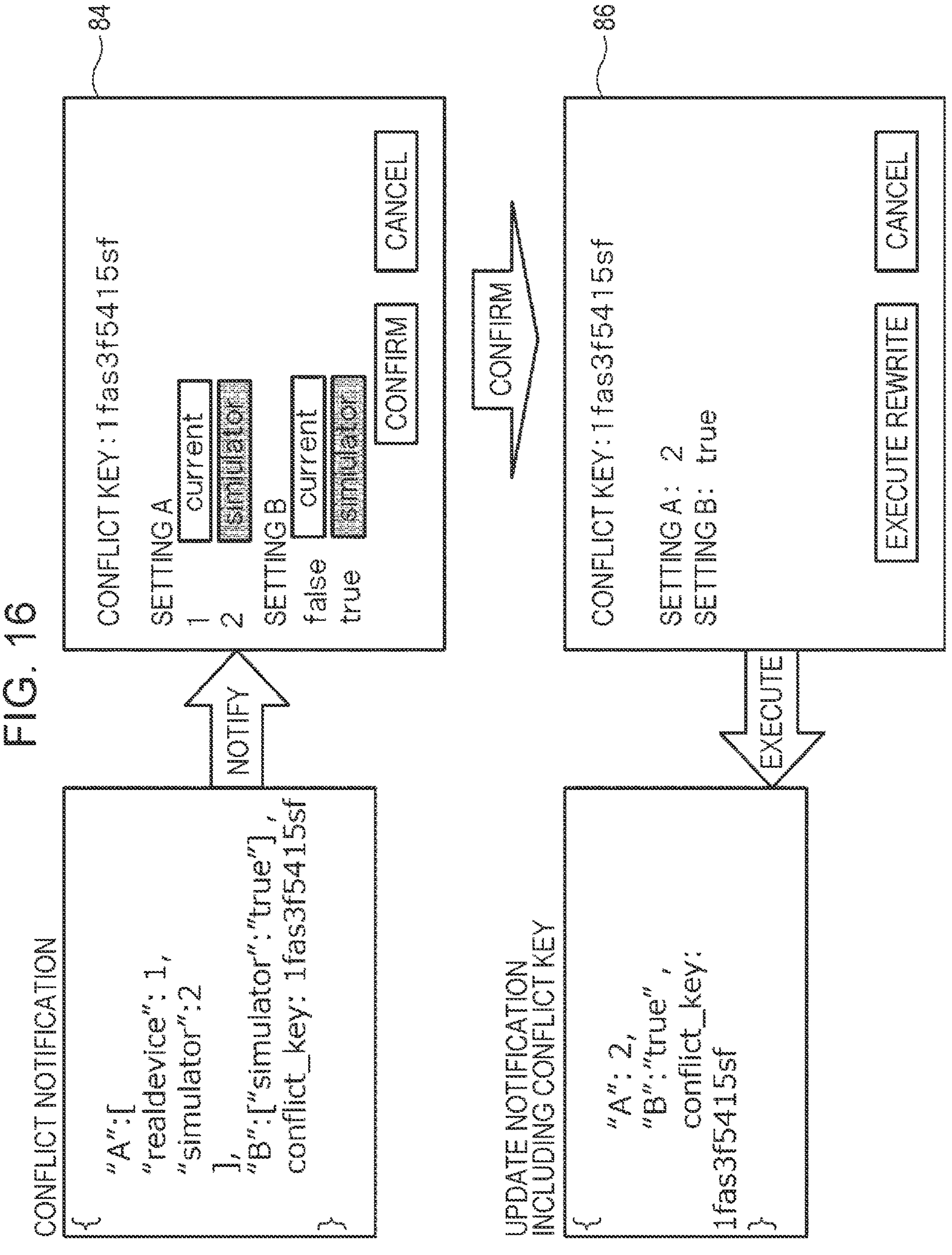
FIG. 16 is a diagram illustrating an example of screens displayed on receipt of a conflict notification.

Next, the process of receiving a conflict notification, which is process 6, will be described. FIG. 15 is a flowchart illustrating an example of the process of receiving a conflict notification, which is process 6, performed by the virtual device 60, the real device 12, and the setting changing system 52. Since the process is a process performed by each of the virtual device 60, the real device 12, and the setting changing system 52, the process will be described below as a process performed representatively by the virtual device 60. Note that FIG. 16 is a diagram illustrating an example of screens displayed when a conflict notification is received.

In step 600, the virtual device 60 receives a conflict occurrence notification, and moves to step 602. For example, the virtual device 60 receives a conflict notification illustrated in FIG. 16. In FIG. 16, an example of a conflict notification is illustrated indicating that the value of setting A is "1" for the real device 12 and "2" for the virtual device 60, the value of setting B is "true" for the virtual device 60, and a conflict having the conflict key "1 fas3f5415sf" is occurring.

In step 602, the virtual device 60 displays information of each setting change requester and the change content, and moves to step 604. For example, as illustrated in FIG. 16, a selection screen 84 for receiving a selection of settings where conflicts are occurring is displayed.

In step 604, the virtual device 60 determines whether the virtual device 60 has received the result of selecting a to-be-reflected setting. The virtual device 60 waits until the determination is affirmative, and then moves to step 606. For example, the virtual device 60 waits until a selection is made and "confirm" is selected on the selection screen 84 in FIG. 16 to display an execution confirmation screen 86, and a command to "execute rewrite" is given.

In step 606, the virtual device 60 outputs a data update notification including a conflict key included in the conflict occurrence notification, and ends the series of processes. For example, the virtual device 60 outputs an update notification including the conflict key illustrated in FIG. 16 to the setting management server 54. In FIG. 16, an example of an update notification is illustrated indicating that setting A is "2" and setting B is "true" for the conflict key "1fas3f5415sf".

Here, the above-described processing performed by the image forming system 10 according to the present exemplary embodiment will be described using specific examples.

Figure 17:
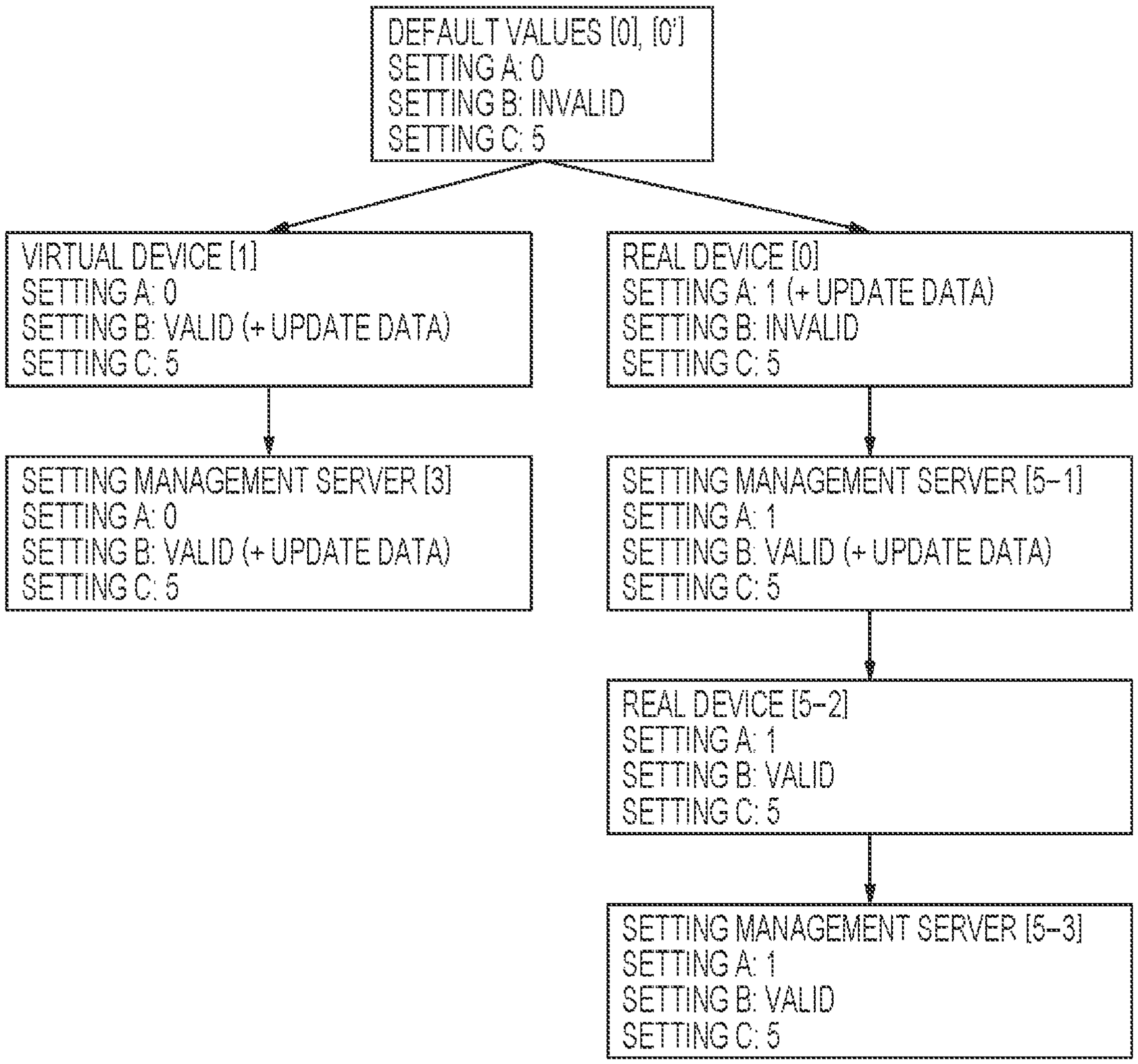
FIG. 17 is a diagram for describing a specific example of the case in which there is no setting conflict in the image forming system according to the present exemplary embodiment.

First, the case in which there is no setting conflict will be described with reference to FIG. 17. FIG. 17 is a diagram for describing a specific example of the case in which there is no setting conflict in the image forming system 10 according to the present exemplary embodiment. Note that the number in [ ] in FIG. 17 corresponds to the number in the following description. In addition, portions indicated as (+update data)

in FIG. 17 have the same value in bracketed regions in addition to the setting data sections 68 and 73; portions with no+only have that value in bracketed regions; and portions with no brackets only have that value in the setting data sections 68 and 73.

In the case where there is no setting conflict, the flow from the assembly at the factory to the installation of the real device 12 is performed as below.

[0] At the assembly factory, setting A of the real device 12 is changed to 1. At this time, the setting controller 67 also adds the change content to the update data section 69.

[0'] The vendor selects the model and creates the virtual device 60 in the simulator environment 50. Setting A of the virtual device 60 is set to 0 by default.

[1] The vendor changes setting B on the virtual device 60. At this time, the setting controller 67 also adds the change content to the update data section 69.

[2] The virtual device 60 registers setting value B updated in the simulator environment 50 into the setting management server 54.

[3] The setting management server 54 records setting value B into the update pending data section 72.

[4] The vendor installs the real device 12.

[5] The vendor performs the batch setting on the real device 12, registers setting A into the setting management server 54 ([5-1]), and reflects setting B onto the real device 12 ([5-2]). The vendor deletes update pending data in the setting management server 54 ([5-3]).

Figure 18:
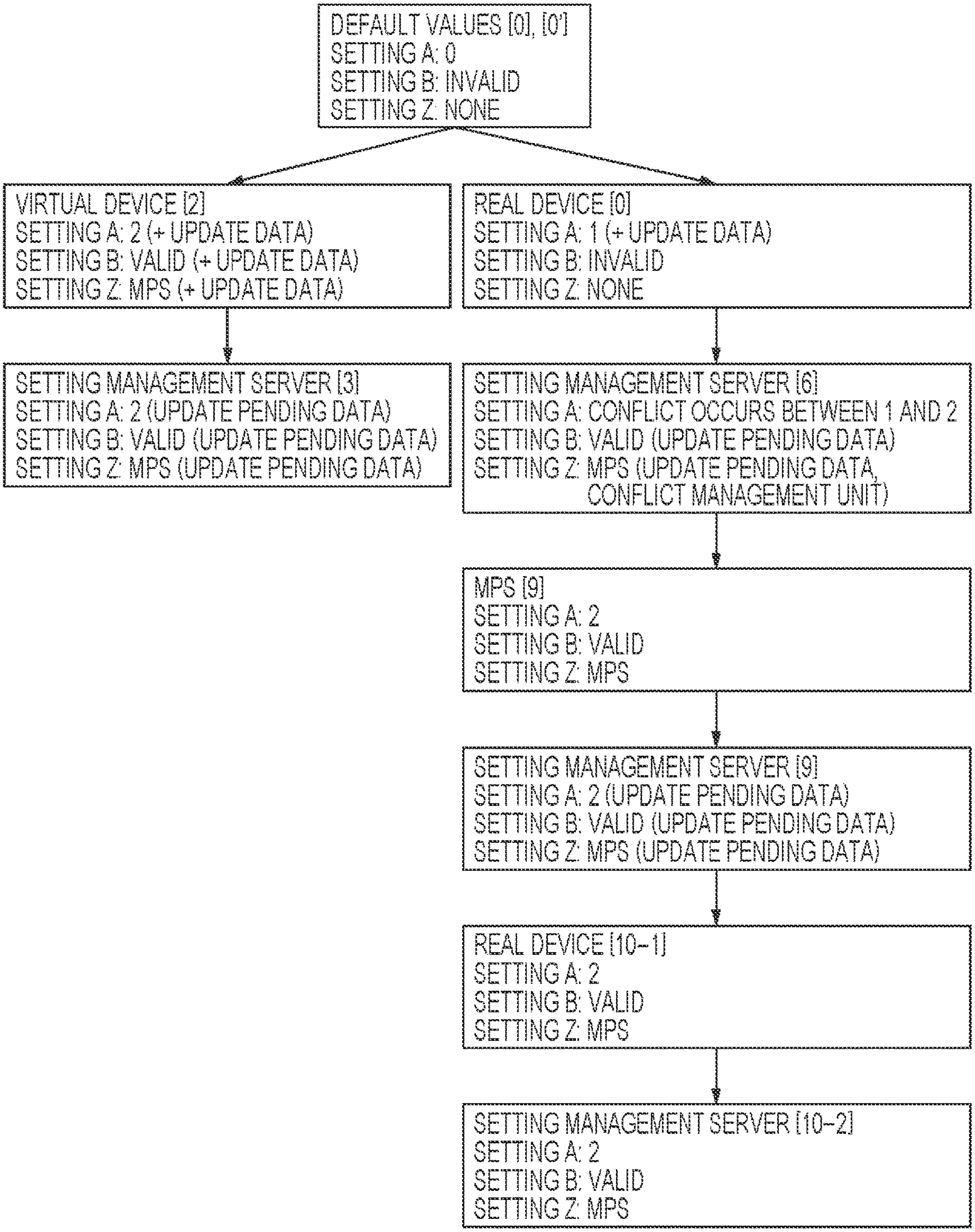
FIG. 18 is a diagram for describing a specific example of the case in which there is a setting conflict in the image forming system according to the present exemplary embodiment.

Next, the case in which there is a setting conflict will be described with reference to FIG. 18. FIG. 18 is a diagram for describing a specific example of the case in which there is a setting conflict in the image forming system 10 according to the present exemplary embodiment. Note that the number in [ ] in FIG. 18 corresponds to the number in the following description. In addition, portions indicated as (+update data) in FIG. 18 have the same value in bracketed regions in addition to the setting data sections 68 and 73; portions with no+only have that value in bracketed regions; and portions with no brackets only have that value in the setting data sections 68 and 73.

In the case where there is a setting conflict, the flow from the assembly at the factory to the installation of the real device 12 is performed as below.

[0] At the assembly factory, setting A of the real device 12 is changed to 1. At this time, the setting controller 67 also adds the change content to the update data section 69.

[0'] The vendor selects the model and creates the virtual device 60 in the simulator environment 50. Setting A of the virtual device 60 is set to 0 by default.

[1] The vendor changes settings A and B of the virtual device 60 in the simulator environment 50. At this time, the setting controller 67 also adds the change content to the update data section 69.

[2] The vendor adds the MPS 11 to setting Z of the notification destination in the occurrence of a conflict on the virtual device 60 in the simulator environment 50.

[3] The virtual device 60 registers the values of updated settings A, B, and Z into the setting management server 54.

[4] The setting management server 54 records setting values A, B, and Z into the update pending data sections 72, and the conflict management unit 75 records setting value Z into the conflict data section 77.

[5] The vendor installs the real device 12.

[6] The vendor performs the batch setting on the real device 12, tries to register setting A into the setting management server 54, and a conflict occurs.

[7] The setting management server 54 outputs a conflict notification to the real device 12, the simulator environment 50, and the MPS 11.

[8] Using the MPS 11, the vendor selects that setting A of the real device 12 is 2, setting B is valid, and setting Z is MPS.

[9] The MPS 11 notifies the setting management server 54 of update data including a conflict key.

The real device 12 performs the batch setting again, receives setting A: 2, setting B: valid, and setting Z: MPS, and reflects them onto the setting data ([10-1]); and the setting management server 54 reflects A: 2, B: valid, and Z: MPS onto the setting data, and empties the update pending data section 72 ([10-2]).

Figure 19:
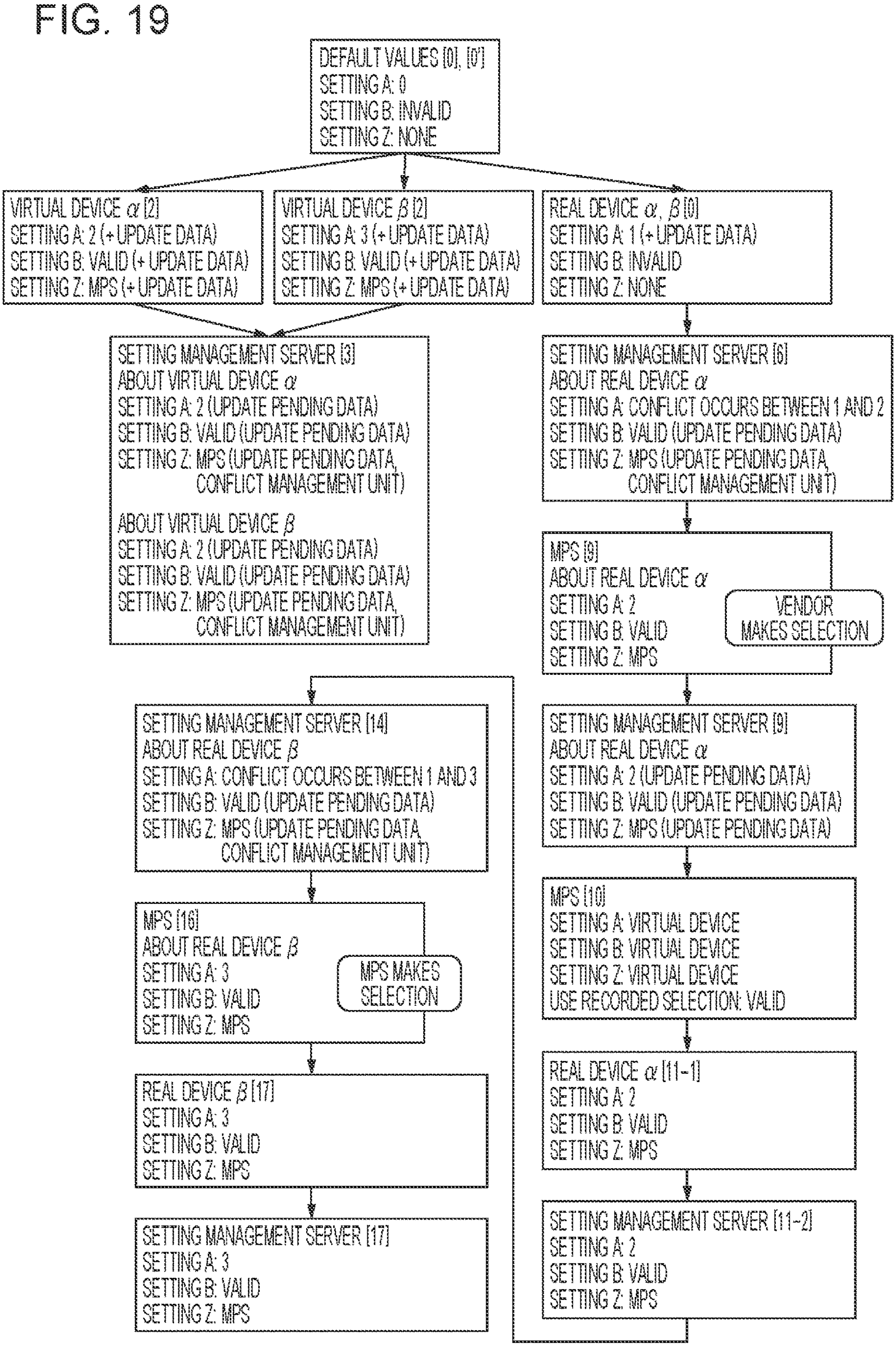
FIG. 19 is a diagram for describing a specific example of the case in which there is a setting conflict and machines are to be set up in the image forming system according to the present exemplary embodiment.

Next, the case in which there is a setting conflict and the settings of multiple devices are to be configured will be described with reference to FIG. 19. FIG. 19 is a diagram for describing a specific example of the case in which there is a setting conflict and the settings of multiple devices are to be configured in the image forming system 10 according to the present exemplary embodiment. Note that the number in [ ] in FIG. 19 corresponds to the number in the following description. In addition, portions indicated as (+update data) in FIG. 19 have the same value in bracketed regions in addition to the setting data sections 68 and 73; portions with no+only have that value in bracketed regions; and portions with no brackets only have that value in the setting data sections 68 and 73. Hereinafter, the case in which the multiple real devices 12 are two real devices 12, a real device α and a real device β, will be described by way of example.

In the case where there is a setting conflict and the settings of multiple devices are to be configured, the flow from the assembly at the factory to the installation of the real device 12 is performed as below.

[0]-[4], which are the same flow as [0] to [4] in the case where there is a conflict as described above, are performed by the real device α and virtual device α as well as by the real device β and the virtual device β.

[5] The vendor installs the real device α.

[6] When the vendor performs the batch setting on the real device α, the vendor tries to register setting A into the setting management server 54, and a conflict occurs.

[7] The setting management server 54 notifies the real devices 12, the simulator environment 50, and the MPS 11 of a conflict.

[8] Using the MPS 11, the vendor selects that setting A of the real device α is 2, setting B is valid, and setting Z is MPS.

[9] The MPS 11 notifies the setting management server 54 of update data including a conflict key.

The MPS 11 records, into the conflict resolving unit 79 that, for settings A, B, and Z, the setting data from the virtual device 60 has been selected.

The vendor performs the batch setting on the real device α again, and reflects setting A: 2, setting B: valid, and setting Z: MPS onto the setting data ([11-1]); and the setting management server 54 reflects A: 2, B: valid, and Z: MPS onto the setting data section 73, and empties the update pending data section 72 ([11-2]).

The vendor applies the selection content recorded in on receipt of a conflict notification by the MPS 11 to other machines as well.

The vendor installs the real device β.

When the vendor performs the batch setting on the real device β, the vendor tries to register setting A into the setting management server 54, and a conflict occurs.

The setting management server 54 notifies the real devices 12, the simulator environment 50, and the MPS 11 of a conflict.

On receipt of a conflict notification, the MPS 11 uses the selection data recorded in to create update data including a conflict key, and notifies the setting management server 54 thereof.

The same operation as is performed on the real device β, and the batch setting is completed.

Figure 20:
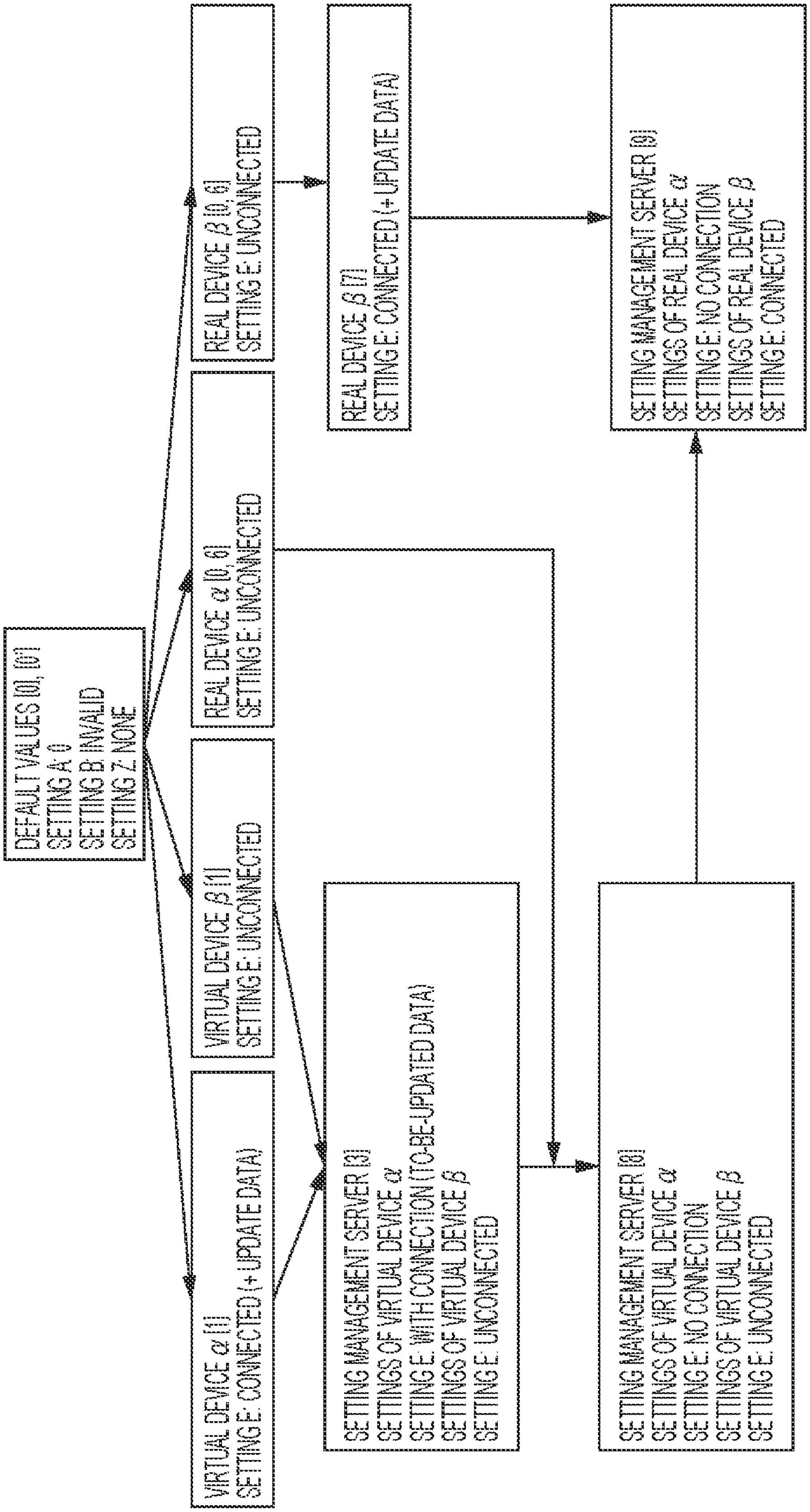
FIG. 20 is a diagram for describing a specific example of the case in which there is a read-only setting conflict in the image forming system according to the present exemplary embodiment.

Next, the case in which there is a read-only setting conflict will be described with reference to FIG. 20. FIG. 20 is a diagram for describing a specific example of the case in which there is a read-only setting conflict in the image forming system 10 according to the present exemplary embodiment. Note that the number in [ ] in FIG. 20 corresponds to the number in the following description. In addition, portions indicated as (+update data) in FIG. 20 have the same value in bracketed regions in addition to the setting data sections 68 and 73; portions with no+only have that value in bracketed regions; and portions with no brackets only have that value in the setting data sections 68 and 73.

In the case where there is a read-only setting conflict, the flow from the assembly at the factory to the installation of the real device 12 is performed as below.

[0] At the assembly factory, real devices α and β are manufactured.

[0'] The vendor selects the model and creates a virtual device α and α virtual device β.

[1] The vendor attaches an optional hard disk (HDD) to the virtual device α. The HDD connection state of setting E of the virtual device α is switched to connected. At this time, the setting controller 67 adds the change content to the update data section 69.

[2] The virtual device 60 registers, into the setting management server 54, the HDD connection state (connected) of setting E of the virtual device α.

[3] The setting management server 54 records setting E of the virtual device α into the update pending data section 72.

[4] At the time of installation, a request from the customer to change the HDD-connected device is received.

[5] The setting management server 54 turns on the real device priority of the read-only setting.

[6] The vendor installs the real devices α and β.

[7] An HDD is attached to the real device β.

[8] When the vendor performs the batch setting on the real device α, there is no conflict, and setting E is deleted from the update pending data section 72 of the setting management server 54.

[9] When the vendor performs the batch setting on the real device α, there is no conflict, and setting E which is "connected" is registered into the setting data section 73 of the setting management server 54.

In the above exemplary embodiment, the simulator environment 50 is described using an example in which a virtual environment on the cloud is applied, but this is not the only possible example. For example, a real device may be prepared at a sales company and the real device may be applied as the simulator environment 50.

In the above exemplary embodiment, the image forming device 12 is described as an example of a machine to be installed, but the image forming device 12 is not the only possible example of the machine. For example, other various machines such as image processing devices and image reading devices may be applied.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In addition, processing performed by each part of the image forming system 10 according to the above exemplary embodiment may be processing performed by software, processing performed by hardware, or processing performed by a combination of both. Moreover, processing performed by each part of the image forming system 10 may be stored in a storage medium as a program and distributed.

Furthermore, the present disclosure is not limited to the above, and, in addition to the above, various modifications can be implemented within a range that does not deviate from the spirit thereof.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An information processing system including:

a processor configured to perform a process, the process including:

holding, in a predetermined region, specific setting information that is setting information to be reflected onto a machine to be installed and that has been specified in an environment different from a machine to be actually set up; and in reflecting the specific setting information onto the machine, in a case where it is determined that a conflict occurs between the specific setting information held in the predetermined region and setting information preconfigured on the machine, notifying a predetermined notification destination, receiving a command to resolve the conflict, and reflecting the conflict-resolved setting information onto the machine.

(((2)))

The information processing system according to (((1))), wherein the different environment is a reproducing environment that virtually reproduces an environment of the machine.

(((3)))

The information processing system according to (((1))) or (((2))), wherein the machine is one of a plurality of machine, and the processor is configured to perform the process on the plurality of machines.

(((4)))

The information processing system according to (((3))), wherein, in a case where the processor is configured to perform the process on the plurality of machines, the processor is configured to configure one or more settings of another machine in accordance with a rule in reflecting the specific setting information onto a machine set up first.

(((5)))

The information processing system according to any one of (((1))) to (((4))), wherein, in a case where the setting information in which a conflict occurs is setting information that dynamically changes depending on a state of the machine, the processor is configured to reflect setting information preconfigured on the machine onto the machine.

(((6)))

An information processing program causing a computer to execute a process, the process including:

holding, in a predetermined region, specific setting information that is setting information to be reflected onto a machine to be installed and that has been specified in an environment different from a machine to be actually set up; and in reflecting the specific setting information onto the machine, in a case where it is determined that a conflict occurs between the specific setting information held in the predetermined region and setting information preconfigured on the machine, notifying a predetermined notification destination, receiving a command to resolve the conflict, and reflecting the conflict-resolved setting information onto the machine.

What is claimed is:

1. An information processing system comprising:

a processor configured to perform a process, the process comprising:

holding, in a predetermined region, specific setting information that is setting information to be reflected onto a machine to be installed and that has been specified in an environment different from a machine to be actually set up, wherein the environment is a virtual device corresponding to the machine as a virtual reproduction of the machine with default settings applied; and in reflecting the specific setting information onto the machine, in a case where it is determined that a conflict occurs between the specific setting information held in the predetermined region and setting information preconfigured on the machine, notifying a predetermined notification destination, receiving a command to resolve the conflict, and reflecting the conflict-resolved setting information onto the machine.

2. The information processing system according to claim 1, wherein the machine is one of a plurality of machines, and the processor is configured to perform the process on the plurality of machines.

3. The information processing system according to claim 2, wherein, in a case where the processor is configured to perform the process on the plurality of machines, the processor is configured to configure one or more settings of another machine in accordance with a rule in reflecting the specific setting information onto a machine set up first.

4. The information processing system according to claim 1, wherein, in a case where the setting information in which a conflict occurs is setting information that dynamically changes depending on a state of the machine, the processor is configured to reflect setting information preconfigured on the machine onto the machine.

5. The information processing system according to claim 1, wherein the default settings that are applied to the virtual device are different from the setting information preconfigured on the machine.

6. A non-transitory computer readable medium storing a program causing a computer to execute a process, the process comprising:

holding, in a predetermined region, specific setting information that is setting information to be reflected onto a machine to be installed and that has been specified in an environment different from a machine to be actually set up, wherein the environment is a virtual device corresponding to the machine as a virtual reproduction of the machine with default settings applied; and in reflecting the specific setting information onto the machine, in a case where it is determined that a conflict occurs between the specific setting information held in the predetermined region and setting information preconfigured on the machine, notifying a predetermined notification destination, receiving a command to resolve the conflict, and reflecting the conflict-resolved setting information onto the machine.

7. The non-transitory computer readable medium according to claim 6, wherein the default settings that are applied to the virtual device are different from the setting information preconfigured on the machine.

8. An information processing method comprising:

holding, in a predetermined region, specific setting information that is setting information to be reflected onto a machine to be installed and that has been specified in an environment different from a machine to be actually set up, wherein the environment is a virtual device corresponding to the machine as a virtual reproduction of the machine with default settings applied; and in reflecting the specific setting information onto the machine, in a case where it is determined that a conflict occurs between the specific setting information held in the predetermined region and setting information preconfigured on the machine, notifying a predetermined notification destination, receiving a command to resolve the conflict, and reflecting the conflict-resolved setting information onto the machine.

9. The information processing method according to claim 8, wherein the default settings that are applied to the virtual device are different from the setting information preconfigured on the machine.

* * * * *